A. CLOSZ.
RESILIENT WHEEL.
APPLICATION FILED JUNE 8, 1916.

1,224,360.

Patented May 1, 1917.
4 SHEETS—SHEET 1.

Adolph Closz,
Inventor

By Geo. P. Kimmel.
Attorney

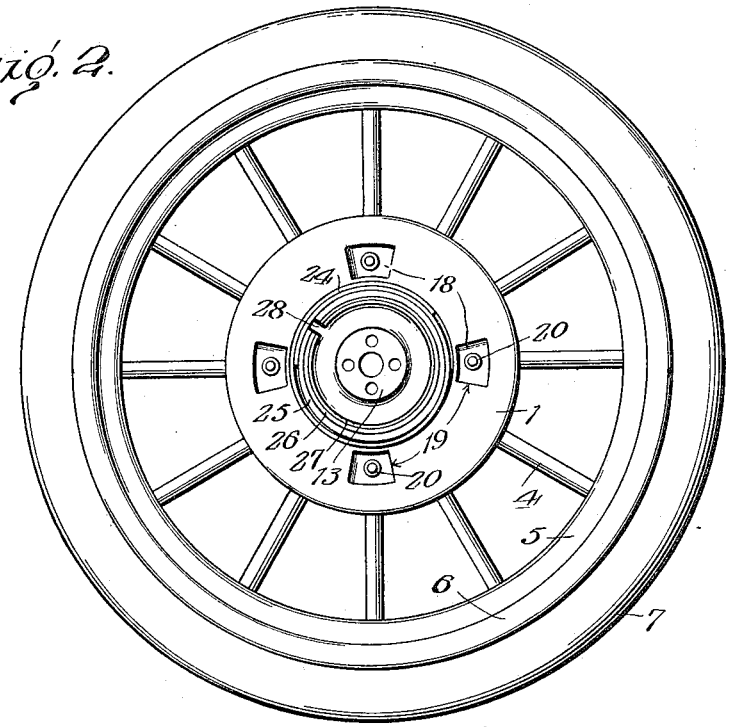
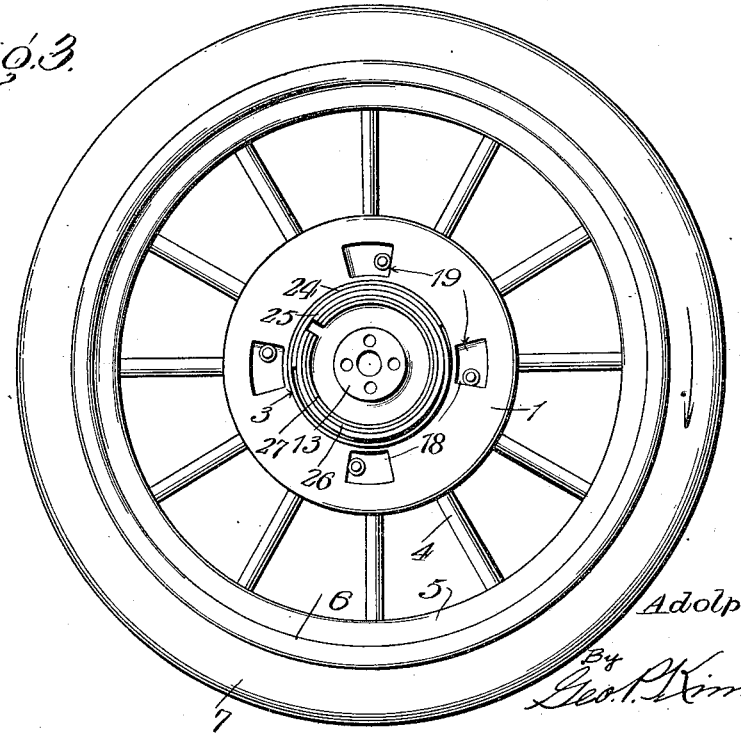

A. CLOSZ.
RESILIENT WHEEL.
APPLICATION FILED JUNE 8, 1916.

1,224,360.

Patented May 1, 1917.
4 SHEETS—SHEET 3.

Adolph Closz,
Inventor
By Geo. P. Kimmel
Attorney

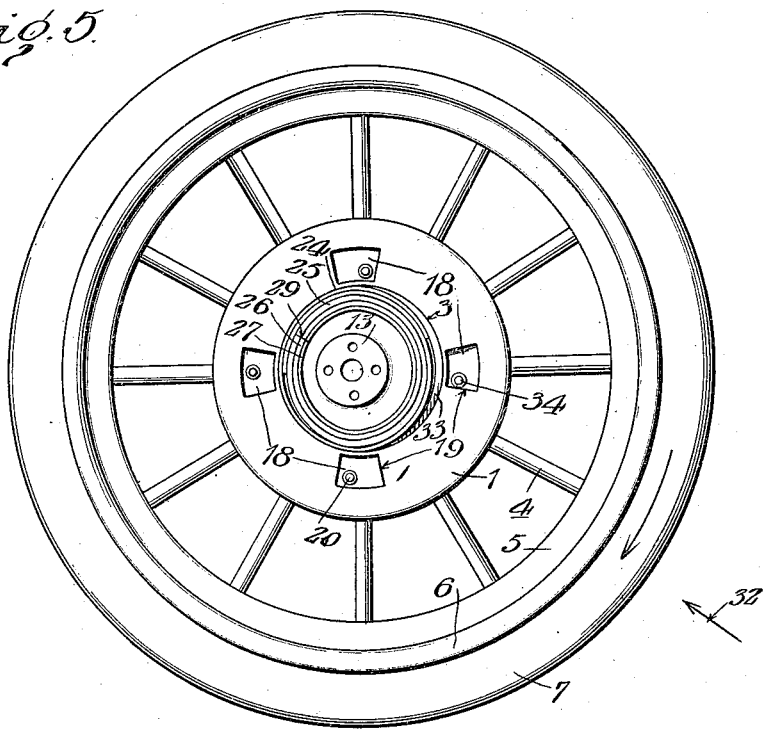
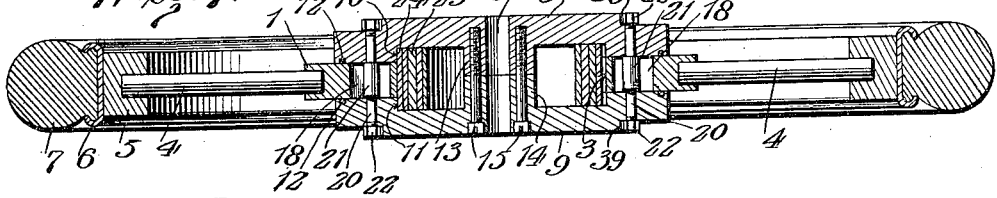
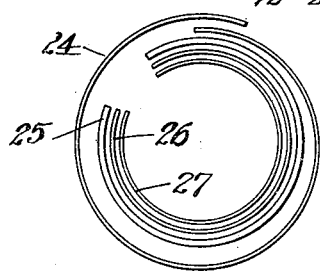

UNITED STATES PATENT OFFICE.

ADOLPH CLOSZ, OF WEBSTER CITY, IOWA.

RESILIENT WHEEL.

1,224,360.  Specification of Letters Patent.  Patented May 1, 1917.

Application filed June 8, 1916. Serial No. 102,541.

*To all whom it may concern:*

Be it known that I, ADOLPH CLOSZ, a citizen of the United States, and resident of Webster City, in the county of Hamilton and State of Iowa, have invented certain new and useful Improvements in Resilient Wheels, of which the following is a specification.

The present invention relates to new and useful improvements in resilient hubs for motor vehicle wheels, car wheels, pulleys and the like, and relates specifically to an improved form of hub structure having shock absorbing and propelling means associated therewith, said shock absorbing means being so arranged that shocks imparted to the wheel hub when the same is in transit are distributed frictionally whereby to prevent breakage of the propelling mechanism.

From the foregoing it will be observed that the primary object of my invention is to provide a wheel hub which when formed with the propelling mechanism is so constructed that said propelling mechanism is relieved of all such shocks and jars common in the previous types of wheel invented and on the market, this feature removing the greatest difficulty now encountered in propelling vehicles.

Another object of my invention is to provide a wheel hub of the class described having an improved form of shock absorbing device for minimizing the strain due to the unevenness of a roadway.

A still further object of my invention is to provide a hub of the class described which may be as readily applied to pulley wheels, car wheels, journal boxes and the like as to automobile wheels.

A still further object of my invention is to provide a wheel hub of the class described which is adapted to frictionally absorb shocks imparted thereto, the shock absorbing mechanism being simple in construction, strong and durable, cheap to manufacture, and effective in operation.

Other objects and advantages to be derived from the use of my improved shock absorbing hub will appear from the following detail description and the claims, taken with an inspection of the accompanying drawings, in which:

Fig. 2 is a similar view of the wheel at rest, one of the retainer plates being removed;

Fig. 3 is a similar view, the wheel proceeding in the direction of the arrow, which will be termed forward hereinafter;

Fig. 6 is a similar view showing the wheel proceeding rearwardly under shock;

Fig. 7 is a transverse sectional view taken on the line 7—7 of Fig. 1; and

Fig. 9 is an enlarged view of the spring elements of my invention showing the same removed from the wheel.

Figure 1:
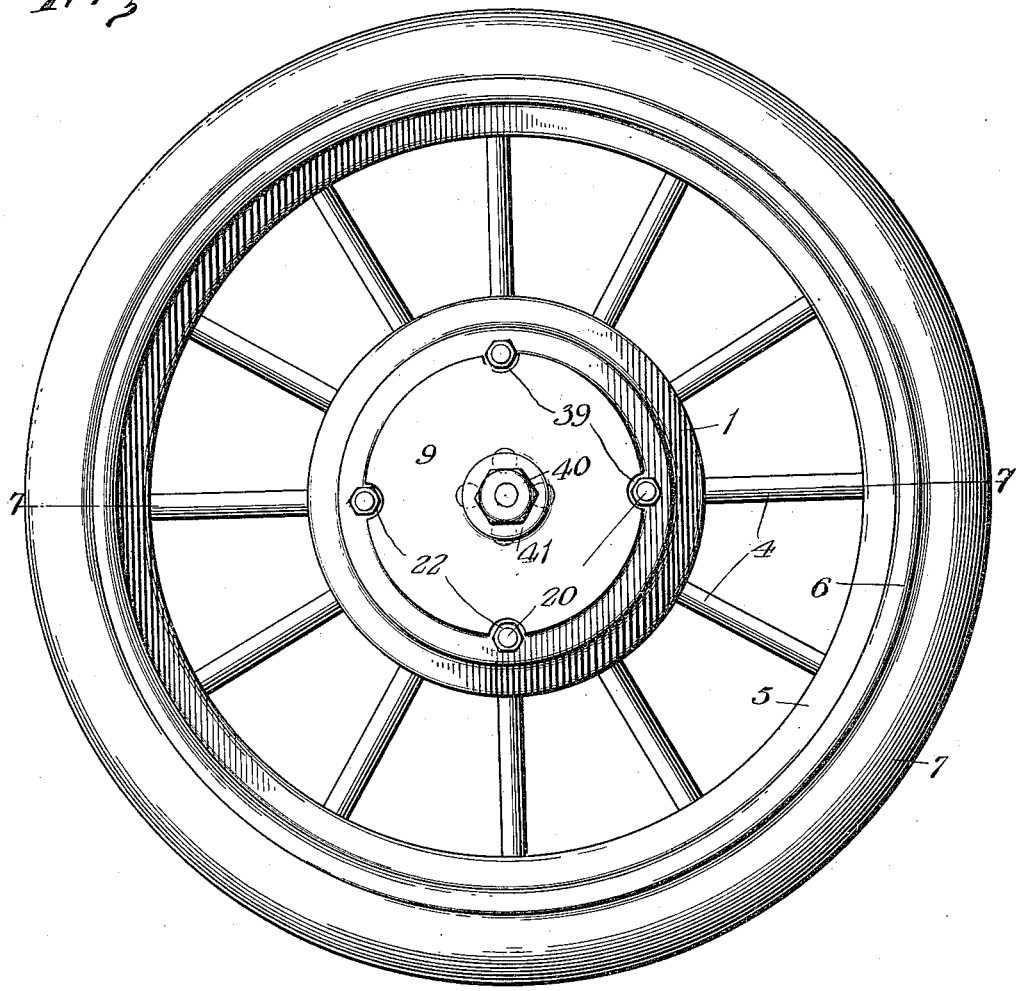
Figure 1 is a side elevational view of a wheel embodying the improvements of my invention.
Figure 8:
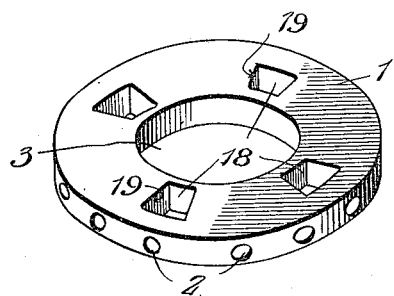
Fig. 8 is an enlarged perspective view of the hub spider.

Referring more particularly to the drawings, wherein similar characters of reference designate like and corresponding parts throughout the various views, 1 designates the main body of the hub, the same being in the form of a disk and provided with a plurality of radial openings or recesses 2 on the outer periphery thereof. The disk or body 1 is provided with a centrally located circular opening 3 for a purpose which will hereinafter appear. The body 1 carries a plurality of radially extending spokes 4 which in the present instance, support and carry the felly 5 of a traction wheel for motor vehicles, the rim 6 being shown, and a solid rubber tire or the like 7 being carried by said rim. Needless to say the felly and spokes may be eliminated and either a railway car wheel tire substituted therefor, sprocket rim, or belt pulley rim as desired. It will also be apparent that the body 1 may be supported in a suitable bearing and the device used for supporting resiliently a shaft.

A pair of retainer plates 8 and 9 are provided, said plates being formed with interior annular flanges 10 and 11, respectively. The inner surface of the plates radially beyond said flanges are adapted to snugly engage the opposite faces of the body 1, suitable packing designated 12 serving to prevent the entrance of dust and other foreign particles of material and to retain a lubricant. The plates 8 and 9 are also provided with concentric enlargements 13 and 14, respectively, fastening screws 15 extending through the plate 9 and the enlargement 14 thereof into the enlargement 13 of the plate 8 for firmly connecting said plate adjacent the axis. A concentric bore 16 extends through both of the enlargements and may receive for rotative movement an axle, a shaft or the like, or may be keyed to an axle, shaft, or the like.

In the event that the hub is to be used as a driving wheel for motor vehicles or the like some propelling means between the plates 8 and 9 and the body 1 must be provided. In the wheels now in use this propelling means usually consists of some positive non-yieldable connecting means which only serves to wrench and jar the wheel structure, power plant, and the passengers in a motor vehicle, or any other type of vehicle to which the wheels of the previous devices are applied. To overcome this difficulty I have provided a plurality of apertures 18 in the body 1, the side walls of said apertures, designated 19, being formed on radial lines described from the axis or center of the body 1. A plurality of bolts 20 having enlargements 21 thereon are carried by the plates 8 and 9, said bolts extending through said plates and having nuts 22 or the like arranged on the free ends thereof. The enlargements 21 are so arranged that the same fall within the apertures 18 for a purpose which will hereinafter appear. I do not lay any stress upon the end walls of the openings 18 the only important point being the radial arrangement of the side walls 19. This point makes successful the operation of my improved wheel hub and is necessary when using the wheel for propelling purposes.

The shock absorbing element of my invention includes a spring 24 of the flat spiral type, the free ends of said spring being arranged in overlapping relation, said spring lying within the opening 3 in the body 1 and exerting normally an outward tension, equal in all directions. This permits the use of a relatively light spring for relatively heavy loads because of the fact that the strength of the spring is distributed. This feature also insures uniform wear of the flanges and the body 1 in view of the fact that the spring 24 engages the flanges and the opening 3 with equal tension. As will be apparent from an inspection of Fig. 7 the diameter of the opening 3 is coincidental with the size of the annular flanges 10 and 11, said springs being, when the wheel is at rest, in engagement with both of the flanges and the peripheral wall of the opening. Upon the deliverance of a shock to the periphery of a wheel the spring 24 is necessarily distorted, owing to the uneven engagement of the flanges 10 and 11 therewith, said flanges moving to positions eccentric relative to the opening 3. To limit the distortion of the hub from the shock I provide a plurality of circular concentric springs 25, 26 and 27, the outermost of the springs being of greater thickness than the innermost springs. The free ends of the springs 25, 26, and 27 are normally, that is, when the wheel is at rest, in spaced relation as indicated at 28 in Fig. 2. Upon distortion of the spring under shock the free ends of the springs 25, 26 and 27 are abutted as indicated at 29 in Figs. 5 and 6. Upon the distortion of the wheel under shock the free overlapping ends of the spring 24 frictionally engage each other serving to absorb the shock. Of course, the springs 25, 26 and 27 coöperate with the spring 24 and enhance the efficiency of the same. The springs 24, 25, 26 and 27 are of such strength as to support loads when running or standing without distortion, only becoming distorted when a shock is delivered to the wheel.

Referring now to the operation and use of the wheel attention is directed to Fig. 2, wherein the wheel is shown under normal conditions, no waste or torsional action being imposed thereon. Under these conditions the bolts 20 are approximately in the centers of the apertures 18. The springs are practically relaxed, only the normal inherent tension of the springs being exerted.

Figure 4:
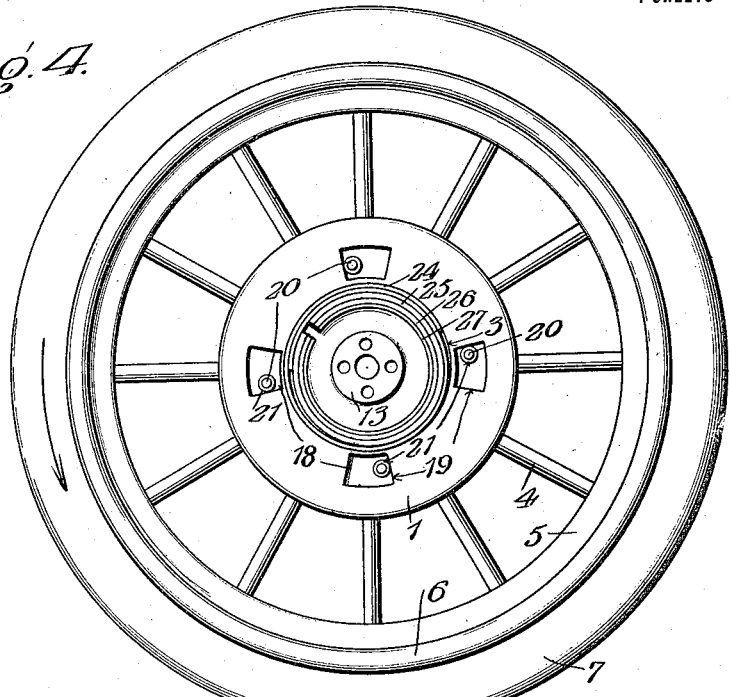
Fig. 4 is a similar view showing the wheel propelling in a rearward direction.

Referring to Fig. 3 wherein the wheel is shown proceeding in the direction of the arrow which in the present instance is termed the forward direction, the bolts 20 are in engagement with certain of the radial walls 19. The wheel is now assumed to be proceeding without shock. The springs are practically under normal conditions no distortion of the same being had, the same may be said about Fig. 4, the difference being that the wheel is now assumed to be proceeding in an opposite direction, that is, in the rearward direction without shock. However, now referring to Fig. 5, the wheel is assumed to be traveling in the forward direction under shock, an arrow designated 32 indicating the direction of the shock. At this time only one of the bolts is in engagement with a side wall 19 of one of the openings 18, this bolt being designated 34 in Fig. 5 and acting as a fulcrum. At this time the springs 24, 25, 26 and 27 are distorted, the springs 25, 26 and 27 being abutted as indicated at 29, thereby serving to limit the direction of the springs and preventing strain due to sudden shock on the bolts 20. Necessarily the springs are spaced from the peripheral wall of the opening 3 as indicated at 33. It will be seen that under these conditions the bolt designated 34 acting as a fulcrum permits the eccentric movement of the plates 8 and 9 relative to the body 1, and the movement of the bolt relative the sides 19 of the opening 18 is such that wear of said bolt under these conditions is practically negligible. The foregoing will be apparent from an inspection of Fig. 5, the remaining bolts being spaced from the walls of the remaining openings 18.

Figure 5:
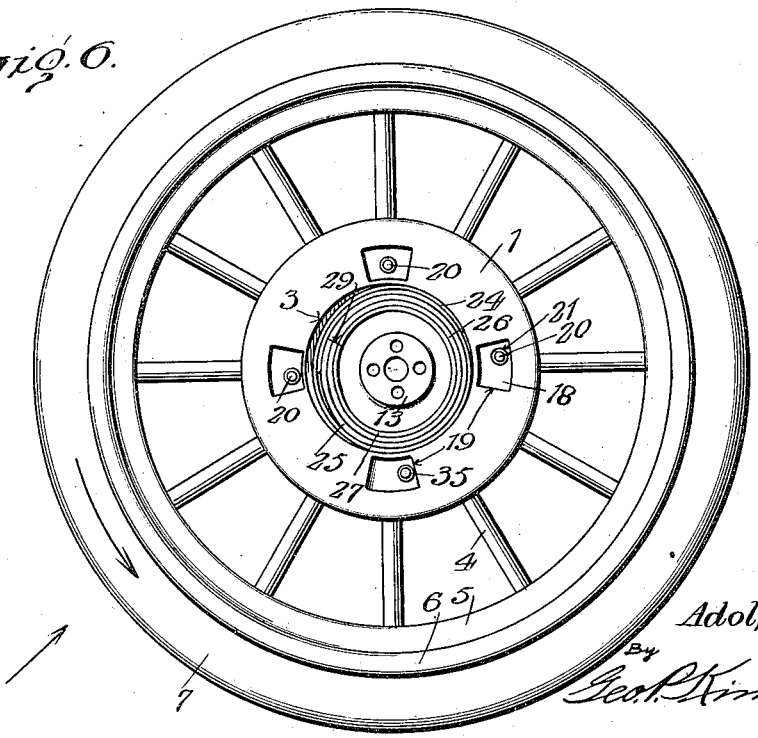
Fig. 5 is a similar view of the wheel showing the same proceeding forward under shock.

Practically the same action as set forth in the preceeding paragraph and shown in Fig. 5 is duplicated when the wheel is revolving rearwardly and receives the shock, this being best shown in Fig. 6. One of the bolts engages a wall of its respective opening as indicated at 35 and acts as a fulcrum similarly to the bolt mentioned hereinbefore and designated 34. The plates 8 and 9 are provided with raised portions formed with recesses 38 and 39 for accommodation of the nut 22. In Fig. 1 I have shown a retaining nut 40 on the free end of an axle, an annular flange formed on said nut engaging over the heads of the screws 15 to prevent dislodgment of said screws. Of course as this retaining means may be eliminated and other retaining means substituted therefor, I am not placing any particular stress thereon.

I desire to lay particular stress upon the coöperation of the springs 24, 25, 26 and 27, said springs not only having relative coöperation but also coöperating with the inner peripheral wall of the body 1, thereby frictionally engaging the body 1 and absorbing the shock imparted to said body. I also desire to lay particular stress upon the radial walls of the apertures 18, this radial arrangement reducing wear upon the bolts 20 to a minimum. An important feature resides in the arrangement of the springs whereby the same act as load carriers by frictional engagement with the flanges 10 and 11 and the opening 3.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. A hub of the class described, including a main body provided with a centrally located circular opening, a pair of plates arranged on opposite sides of said body and in snug engagement therewith, said plates being provided with interior annular flanges in relative alinement and in alinement with said opening, a circumferentially arranged spring element having the free ends thereof overlapping and peripherally engaging simultaneously said opening and said flanges, and a plurality of circumferentially arranged flat spring elements within first said spring elements, the free ends of second said spring elements being adapted to abut, at times, to limit the distortion of the hub, under shock.

2. In a resilient hub, the combination of a body having a centrally located circular opening, plates on either side of said body provided with annular interior flanges in alinement circumferentially with said opening, a circular spring element arranged within said opening and having the marginal edges thereof in engagement with said flanges, movement limiting members within said spring element, said body being provided with a plurality of apertures the side walls of which are formed on lines radiating from the axis of the plates, and a plurality of members carried by said plates extending through said apertures and adapted, at times, to engage said radial walls.

3. In a resilient hub, the combination of a body to be attached to a wheel rim and spokes, plates carried by an axle and engaged on opposite sides of said body, said plates being snugly engaged with the body and having packing carried thereby, said plates having annular flanges on their inner faces, said body having an opening in alinement with said flanges forming a chamber to receive a lubricant, circumferential spring elements arranged each within said chamber and engaging simultaneously with the wall of said opening and said flanges, said plates having a plurality of openings therein the side walls of which are formed on lines extending radially from the axle, bolt members extending through said openings to transmit motion from said plates to said body, and a second set of spring elements arranged within first said set and having their free ends in spaced relation adapted to abut upon eccentric movement of the plates relative to the body, whereby to limit such movement.

4. In a shock absorbing hub, the combination of a body having a concentric circular opening, plates arranged on either side of said body and closing said opening, a circular spring element arranged circumferentially within said opening and having the free ends thereof in overlapping relation, and a plurality of flat circular spring elements within first said spring element, second said spring elements having their free ends in spaced relation adapted to abut when the plates and body are relatively moved for limiting such movement.

In testimony whereof, I affix my signature hereto.

ADOLPH CLOSZ.